(12) United States Patent
Gwaltney et al.

(10) Patent No.: US 6,456,394 B1
(45) Date of Patent: Sep. 24, 2002

(54) METHOD FOR REDUCING HALO PRINT DEFECTS ASSOCIATED WITH COLOR IMAGES

(75) Inventors: Mark A. Gwaltney, Fairport, NY (US); Kevin M. Sheridan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/209,082

(22) Filed: Dec. 10, 1998

(51) Int. Cl.$^7$ .............. G06F 15/00; H04N 1/46; G06K 9/42
(52) U.S. Cl. .......... 358/1.9; 358/515; 382/256
(58) Field of Search .......... 358/1.9, 518, 1.2, 358/1.1, 1.8, 515, 504, 520, 522, 527, 534; 382/167, 162, 254, 256, 258, 267, 268, 275

(56) References Cited

U.S. PATENT DOCUMENTS

| | | | |
|---|---|---|---|
| 4,580,219 A | * 4/1986 | Pele et al. | 364/414 |
| 5,581,667 A | 12/1996 | Bloomberg | 395/109 |
| 5,613,046 A | 3/1997 | Dermer | 395/109 |
| 5,903,660 A | * 5/1999 | Huang et al. | 382/132 |
| 6,038,031 A | * 3/2000 | Murphy | 358/1.09 |
| 6,055,340 A | * 4/2000 | Nagao | 382/261 |
| 6,240,135 B1 | * 5/2001 | Kim | 375/240.01 |
| 6,332,044 B1 | * 12/2001 | Loce et al. | 382/269 |

* cited by examiner

Primary Examiner—Madeleine Nguyen
(74) Attorney, Agent, or Firm—Fay, Sharpe, Fagan, Minnich, & McKee, LLP

(57) ABSTRACT

A method is disclosed for reducing halo print defects occurring in printed/copied color images. The method includes detecting a boundary between a first image object and a second image object within a color separation of the color document, and modifying the video values of a plurality of pixels within the color separation so that the video values slope toward the boundary, the plurality of pixels being located within a transition zone adjacent the boundary. In the case where toner black is used, the video values of a plurality of pixels within a transition zone of a toner black color separation are modified so that the video values ramp or slope down toward the boundary, and the video values of a plurality of pixels within transition zones of a cyan color separation, a magenta color separation, and a yellow color separation are modified so that the video values ramp or slope up toward the boundary. In effect, the process increasingly replaces toner black with process black (i.e. equal parts of cyan, magenta, and yellow toner particles) in the transition zone in a direction toward the boundary. As a result the electrostatic interactions on the photoreceptor are reduced and halo print defects are eliminated.

18 Claims, 6 Drawing Sheets

METHOD FOR REDUCING HALO PRINT DEFECTS ASSOCIATED WITH COLOR IMAGES

BACKGROUND OF THE INVENTION

The present invention relates generally to digital color imaging, and more particularly to a method for reducing halo print defects occurring in printed/copied color images.

Electrophotographic marking is a well known and commonly used method of copying and printing documents. Electrophotographic marking is performed by exposing an image representation of a desired document onto a substantially uniformly charged photoreceptor. In response to the image representation, the photoreceptor discharges so as to create an electrostatic latent image of the desired document on the photoreceptor's surface. Toner particles are then deposited onto the latent image so as to form a toner image. The toner image is then transferred from the photoreceptor onto a substrate such as a sheet of paper. The transferred toner image is then fused to the substrate, usually using heat and/or pressure. The surface of the photoreceptor is then cleaned of residual developing material and recharged in preparation for the production of another image.

Electrophotographic marking can be used to produce color images by repeating the above process once for each color of toner that is used to make the composite color image. For example, in one color process, referred to as a REaD IOI process (Recharge, Expose, and Develop, Image On Image), a charged photoreceptive surface is exposed to an image representation of a first color separation, such as black. The resulting electrostatic latent image is then developed with black toner particles to produce a black toner image. The charge, expose, and develop process is repeated for a second color separation, such as yellow, then for a third color separation, such as magenta, and finally for a fourth color separation, such as cyan. The various color toner particles are placed in superimposed registration to form a composite toner image on the photoreceptor. The composite toner image is then transferred and fused onto a substrate to form a composite color image.

The REaD IOI process can be implemented in various ways. For example, the process can be implemented in a single-pass document processing system (e.g. color printer or color copier) wherein a final composite color image is produced in a single pass of the photoreceptor through the document processing system. A second implementation is in a multi-pass document processing system wherein the photoreceptive surface makes multiple passes through a single charging station and a single exposure station wherein only one color toner image is produced during each pass of the photoreceptor through the charging and exposure stations.

A problem known as a halo print defects can occur at the boundaries between different colored areas on a composite color image resulting from an IOI image forming process. FIGS. 1–4 illustrate the exemplary case of a first-colored, such as cyan, square area 10 having a second-colored, such as black, border area 12 surrounding the square. As shown in FIGS. 1 and 3A, the halo print defect can be seen as a space or gap 14 between the colored areas 10 and 12 of the composite toner image on the photoreceptor 16. In the resulting color image, the surface of the underlying substrate can be seen between the colored areas 10 and 12 because of the lack of toner deposited in the gap 14 on the photoreceptor 16.

However, as shown in FIGS. 2 and 3B, no such gaps exist between the colored areas 10 and 12 of the digital image representations that modulate an exposure device, such as a raster output scanner (ROS), to form the electrostatic latent images on the photoreceptor. Halo print defects are primarily caused by electrostatic interactions occurring at the boundary between two adjoining color areas of the composite toner image on the photoreceptor 16, and by color separation to separation registration errors.

Referring to FIG. 3C, trapping is a solution used in the printing industry to compensate for halo print defects primarily caused by color separation to separation registration errors. In trapping, the boundary 19 between two adjacent color areas 20, 22 of a printed document 24 is overlapped by one of the color areas, such as color area 20. Thus, making the color area 20 slightly larger eliminates the halo print defect in the resulting printed image.

A digital counterpart to trapping is disclosed in U.S. Pat. No. 5,581,667, issued to Steven J. Bloomberg and assigned to the same assignee of the present invention. In xerographic systems, however, trapping does not completely eliminate halo print defects because the toner gaps formed between adjacent color areas are due to a combination of registration errors and electrostatic interactions.

FIG. 4 maps the video values for each pixel of an 8-bit system (where a gray scale value of 255 is 100% on) along a given raster scan line through the color (CMYK) separations of the image objects 10 and 12. The value of the pixels on one side of the edge/boundary 18 in the black color separation are about 255, and the value of the pixels on the other side of the edge/boundary 18 in the cyan color separation are also about 255. It is suggested that the electrostatic interactions occurring along the boundary between the black toner image and the cyan toner image on the photoreceptive belt result in the occurrence of the halo print defects.

Accordingly, it has been considered desirable to develop a new and improved method for reducing halo print defects associated with printed and copied color images that meets the above-stated needs and overcomes the foregoing difficulties and others while providing better and more advantageous results.

SUMMARY OF THE INVENTION

The present invention provides a method for transitioning from a first-colored area to a second-colored area within a transition zone between the first-colored area and the second-colored area. In particular, the pixels values within the transition zone are ramped or otherwise sloped toward the edge/boundary to prevent the formation of halo print defects along the edge/boundary in the resulting multi-color output document.

Thus, in accordance with one aspect of the present invention, a method for reducing halo print defects in a color document generated by an image processing system is disclosed. The method includes a) detecting a boundary between a first image object and a second image object within a color separation of the color document, and b) modifying the video values of a plurality of pixels within the color separation so that the video values slope toward the boundary, the plurality of pixels being located within a transition zone adjacent the boundary.

In accordance with another aspect of the present invention, an image processing system is provided. The image processing system includes an image forming section for generating an composite toner image on a charge retentive surface, and an image processing section for processing pixel values associated with a plurality of color separations representing an original multiple-color image wherein the pixel values are transferred to the image forming section. The image processing section includes circuitry for detecting a boundary between a first image object and a second image object within a color separation, and circuitry for modifying the values of a plurality of pixels within the color separation so that the pixel values slope toward the boundary, the plurality of pixels being located within a transition zone adjacent the boundary.

One advantage of the present invention is the provision of a method for reducing the occurrence of print halo defects occurring in an output document.

Another advantage of the present invention is the provision of a method for eliminating the occurrence of print halo defects occurring in an output document.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE PREFERRED EMBODIMENT(s)

Figure 1:
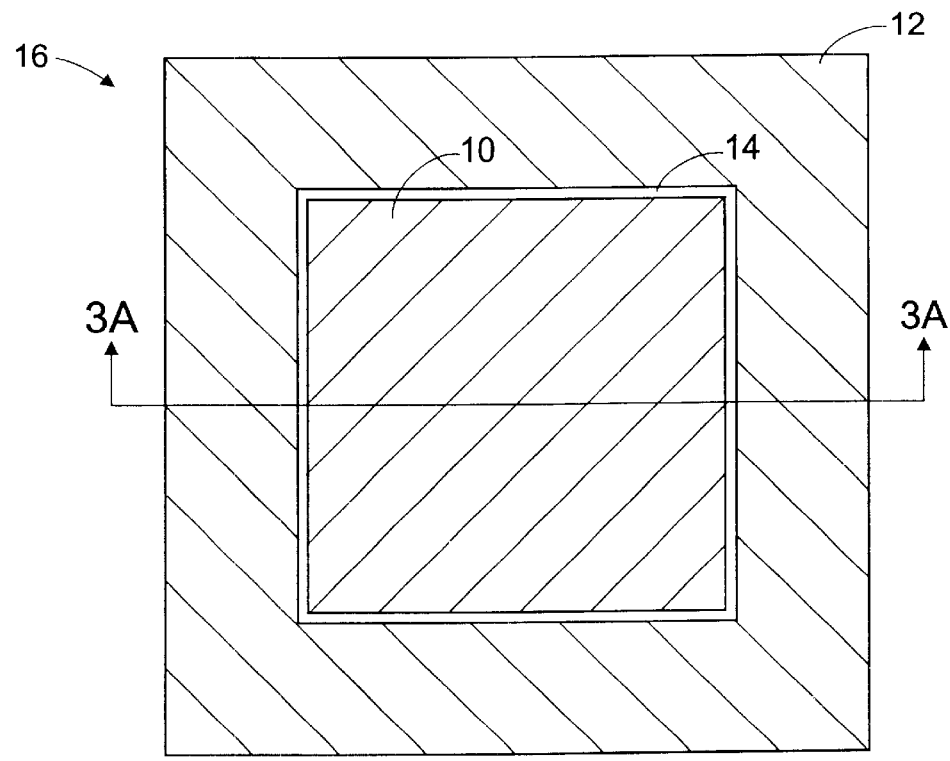
FIG. 1 is a plan view of a photoreceptor carrying a composite toner image with a halo print defect occurring along an edge/boundary between a first-colored square area and a corresponding second-colored border area of the image.
Figure 2:
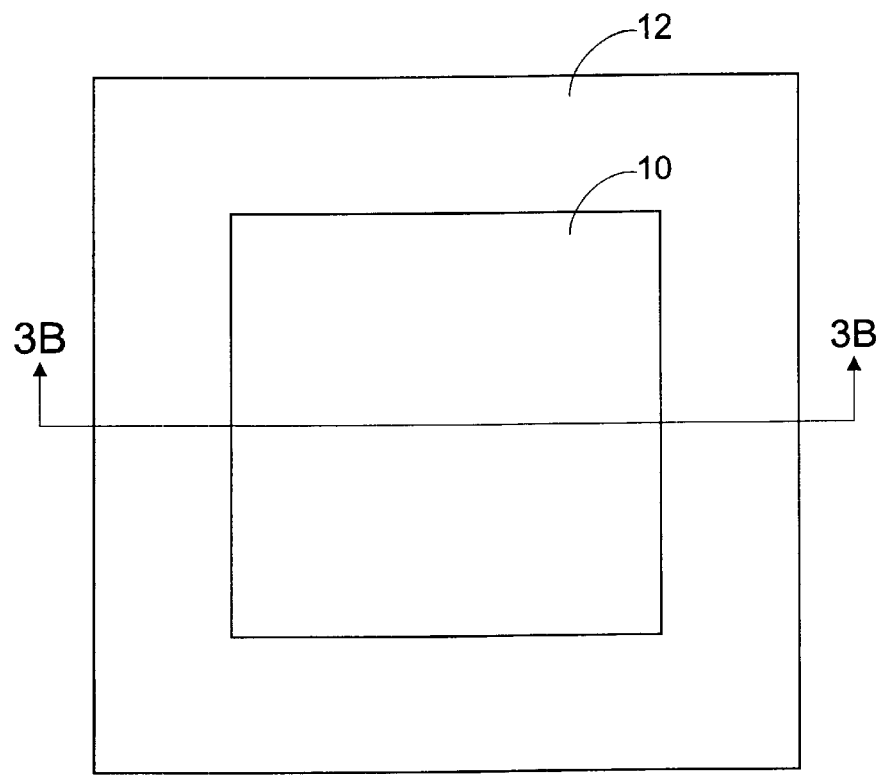
FIG. 2 is a composite digital image representation of the original digital image used to produce the toned image of FIG. 1.
Figure 3A:
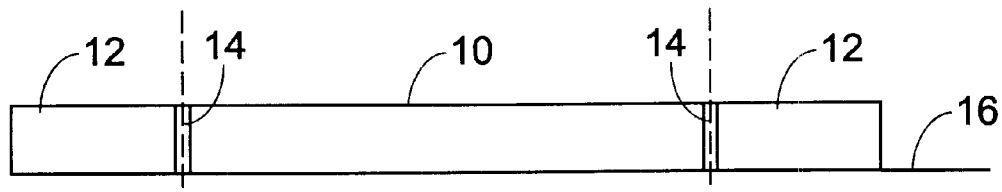
FIG. 3A is a cross-section view of the photoreceptor of FIG. 1.
Figure 3B:
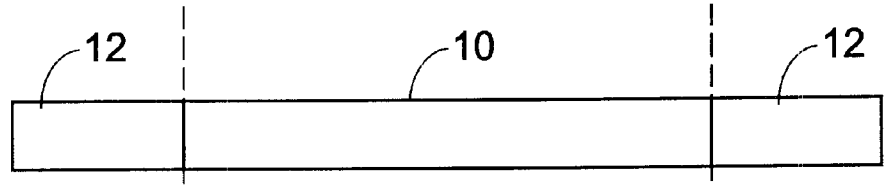
FIG. 3B is a cross-section view of the digital image representation of FIG. 2.
Figure 3C:
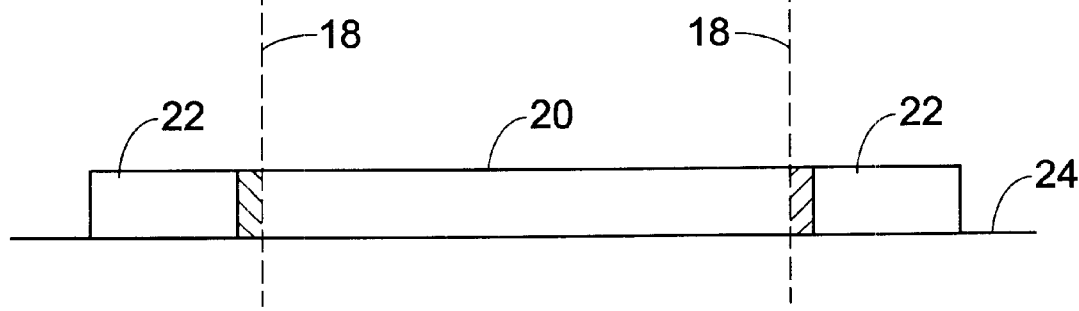
FIG. 3C is a cross-section view of an offset printed document wherein a first-colored square area overlaps a boundary with a corresponding second-colored border area.

The following is a detailed description of the drawings illustrated in the present invention. In this description, the terms "image data" or "pixels" in the form of video image signals, which may be either analog or digital voltage representations of an image, indicate a representation of an image provided from a suitable source. For example, the image signals may be obtained through line by line scanning of an image bearing the original by one or more photosensitive elements, such as a multiple photosensor array of charge couple devices commonly referred to as CCDs. Line by line scanning of an image bearing the original for the duration of image data is well known and does not form a part of the present invention.

Image data may also be derived by a computer workstation program in accordance with document creation application software or from a data storage device. In content, the original video image signals may be composed entirely of a single image component such as lines, text, low frequency halftones, high frequency halftones, contones, or any combination thereof.

The following description may also include references to slowscan and fastscan digital image data when discussing the directionality of two-dimensional filtering architecture. For purposes of clarification, fastscan data is intended to refer to individual pixels located in a succession along a raster of image information, while slowscan data refers to data derived from a common raster position across multiple rasters or scanlines.

As an example, slowscan data would be used to describe signals captured from a plurality of elements along a linear photosensitive array as array is moved relative to a document. On the other hand, fastscan data would refer to the sequential signals collected along the length of the linear photosensitive array during a single exposure period which is also commonly referred to as a raster of data.

Moreover, the present invention is described with reference to an 8-bit system where the video signal has a value in a range between 0 and 255 where 255 is 100% on. However, any range from the video signal can be utilized in conjunction with the present invention. Furthermore, in the following description, the term "grey level" will be used to describe both black and white and color applications.

Furthermore, in describing the present invention, the term "pixel" will be utilized. This term may refer to an electrical, (or optical, if fiber optics are used), signal which represents the physical measurable optical properties at a physical definable area on a receiving medium. The receiving medium can be any tangible document, photoreceptor, or marking material transfer medium.

Moreover, the term "pixel" may refer to an electrical, (or optical, if fiber optics are used), signal which represents the physically measurable optical properties at a physically definable area on the display medium. A plurality of the physically definable areas for both situations represent the physically measurable optical properties of an entire physical image to be rendered by either a material marking device, electrically or magnetic marking device, or optical display device.

Lastly, the term "pixel," in the scanning environment, may refer to an electrical, (or optical, if fiber optics are used), signal which represents physical optical property data generated from a signal photosensor cell when scanning a physical image so as to convert the physical optical properties of the physical image to an electronic or electrical representation. In other words, in this situation, a pixel is an electrical, (or optical), representation of the physical optical properties of a physical image measured at a physical definable area on a optical sensor. The term "pixel," in the rendering environment, may refer to an electrical, (or optical, if fiber optics are used), signal which represents the smallest physical area on a recording substrate that can be rendered. In other words, in this situation, a pixel is an electrical, (or optical), representation of the physical spot created by a laser in a laser printed or the physical spot created by the smallest rendered ink droplet.

Figure 5:
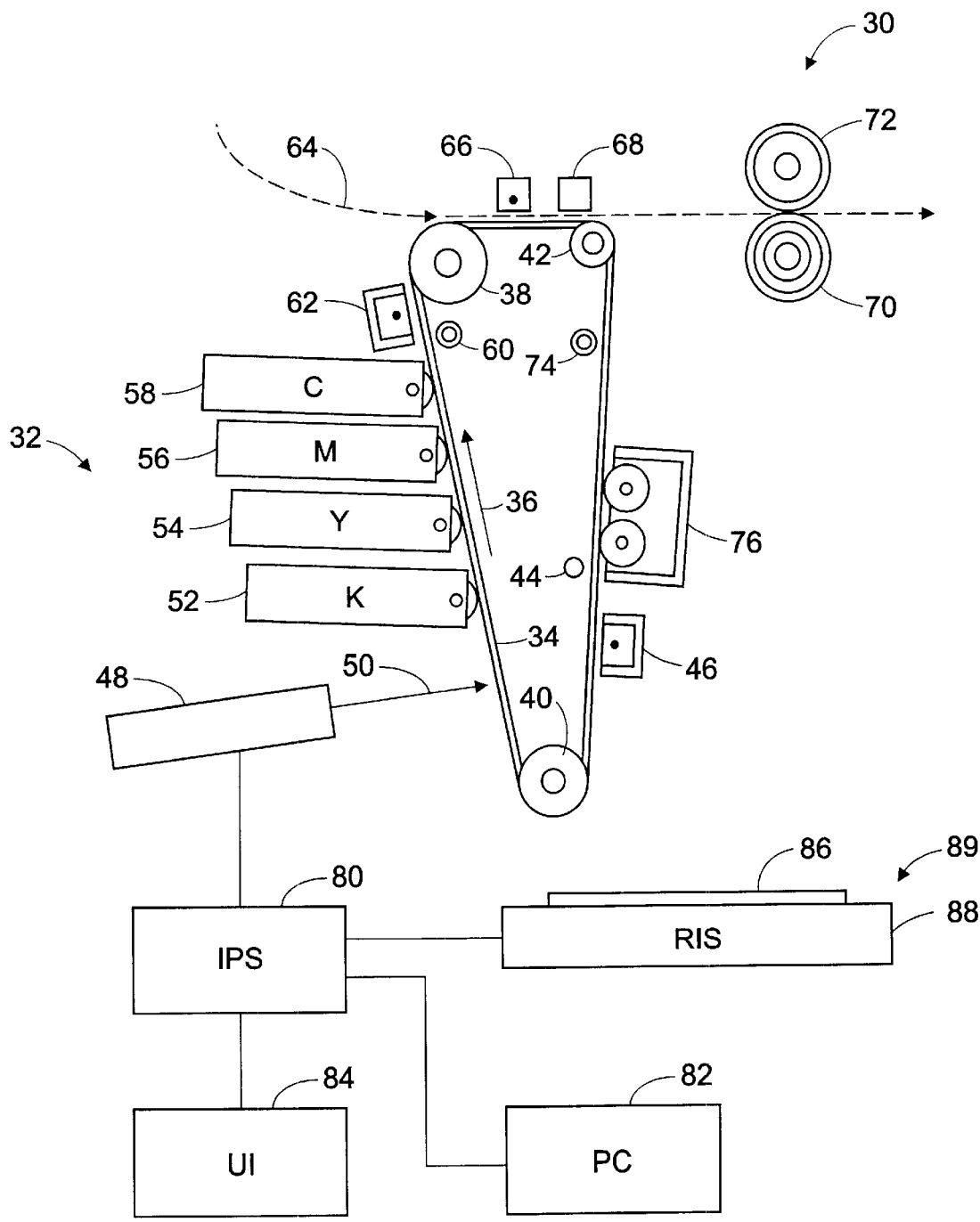
FIG. 5 is a diagrammatic illustration of an exemplary image processing system that incorporates the features of the present invention therein.

Referring now to FIG. 5, an image processing system 30, such as a xerographic printing or copying machine, includes an image forming subsection 32. In the embodiment being described, the image forming subsection is implemented as a multi-pass system wherein a photoreceptive surface makes multiple passes or cycles through the image forming section to produce multiple color toner images on the photoreceptive surface. However, it should be appreciated that the image forming subsection 32 can also be implemented as a single-pass system wherein multiple color toner images are produced in a single pass of the photoreceptive surface through the image forming section.

The image forming subsection 32 includes a photoreceptor belt 34, such as an Active Matrix (AMAT) photoreceptor belt, that travels in the direction indicated by the arrow 36. The belt 34 includes a charge retentive surface. Belt travel is brought about by mounting the photoreceptor belt about a drive roller 38 (that is driven by a motor which is not shown) and tension rollers 40 and 42.

As the photoreceptor belt is driven, each part of it passes through each of the subsequently described process stations. For convenience, a single section of the photoreceptor belt, referred to as the image area, is identified. The image area is that part of the photoreceptor belt which is to receive the various toner layers which, after being transferred and fused to a substrate, produce the final color image. While the photoreceptor belt may have numerous image areas, since each image is processed in the same way a description of the processing of one image area suffices to fully explain the operation of the image forming section 32.

As mentioned, the production of a color document in a multi-pass image processing system takes place in multiple cycles. The first cycle can begin with the image area passing a precharge erase lamp 44 that illuminates the image area so as to cause any residual charge which might exist on the image area to be discharged. Such erase lamps are common and their use for initial erasure is well known.

As the photoreceptor belt continues its travel, the image area passes through a charging station 46 where a corona generating device charges the image area to a relatively high, substantially uniform potential. After passing through the charging station 46, the image area advances until it reaches an exposure station 48. At the exposure station the charged image area is exposed to a modulated laser beam 50 that raster scans the image area to form an electrostatic latent image of a black color separation. The laser beam 50 is modulated by an image representation (light, binary, etc.) of the black color separation. The modulated laser beam then selectively discharges portions of the charged image area to form the electrostatic latent image on the photoreceptor.

The exposure station 48 can include a raster output scanner (ROS) having a laser with rotating polygon mirror blocks. The ROS illuminates, via the mirror, the charged portion of the photoconductive belt, at a rate of about 400 pixels per inch, to achieve the subtractive primary latent images. After passing the exposure station 48 the exposed image area passes a black development station 52 where charged black toner particles are deposited onto the exposed image area. The charged black toner adheres to the electrostatic latent image on the photoreceptor.

After passing the black development station the image area advances past a number of other stations whose purposes are described subsequently and returns to charging station 46 where the second image processing cycle beings.

In particular, the image area with a black toner image is recharged to a substantially uniform charge level desired for exposure and development of a yellow toner image. The recharged image area then advances to the exposure station 48.

In the exposure station, the image area is exposed to the modulated beam 50 to produce an electrostatic latent image of a yellow color separation. The laser beam 50 is modulated by an image representation (light, binary, etc.) of the yellow color separation. The modulated laser beam selectively discharges portions of the recharged image area to form the electrostatic latent image on the photoreceptor. After passing the exposure station 48 the now exposed image area advances past a yellow toner development station 54 that deposits yellow toner onto the exposed image area. The charged yellow toner adheres to the electrostatic latent image on the photoreceptor.

After passing the yellow development station the image area, with its layered black and yellow toner images, advances to the charging station 46 and the third processing cycle beings. The charging station 46 recharges the image area to a substantially uniform charge level desired for exposure and development of a magenta toner image. After passing the charging station 46, the recharged image area with its two toner layers advances once again to the exposure station 48.

In the exposure station, the image area is once again exposed to the modulated beam 50 to produce an electrostatic latent image of a magenta color separation. The laser beam 50 is modulated by an image representation (light, binary, etc.) of the magenta color separation. The modulated laser beam selectively discharges portions of the recharged image area to form the electrostatic latent image on the photoreceptor. After passing the exposure station 48 the now exposed image area advances past a magenta toner development station 56 that deposits magenta toner onto the exposed image area. The charged magenta toner adheres to the electrostatic latent image on the photoreceptor resulting in a third toner image being deposited (i.e. layered) on the image area.

The image area with its three toner layers then advances past the charging station 46 to again produce the desired charge on the photoreceptor thus beginning the fourth cycle. The substantially uniformly charged image area with its three toner layers then advances once again to the exposure station 48. In the exposure station, the image area is again exposed to the modulated beam 50 to produce an electrostatic latent image of a cyan color separation. The laser beam 50 is modulated by an image representation (light, binary, etc.) of the cyan color separation. The modulated-laser beam selectively discharges portions of the recharged image area to form the electrostatic latent image on the photoreceptor. After passing the exposure station 48 the now exposed image area advances past a cyan toner development station 58 that deposits cyan toner onto the exposed image area. The charged cyan toner adheres to the electrostatic latent image on the photoreceptor resulting in a fourth toner image being deposited (i.e. layered) on the image area.

After passing the cyan development station the image area has four toner images layered thereon which together make up a composite color toner image comprised of individual toner particles. A pretransfer erase lamp 60 can be used to discharge the image area prior to advancing to a pre-transfer charging station 62 that supplies a charge, such as negative ions, to the image area necessary to transfer the composite toner image from the photoreceptor to a substrate.

The image area continues to advance in the direction 36 past the roller 38. A substrate 64 is then placed over the image area using a sheet feeder (not shown). As the image area and the substrate continue their travel they pass a transfer corotron 66 that applies a charge, such as a positive ions, onto back of the substrate 64. The positive ions attract the negatively charged toner particles from the image area onto the substrate.

As the substrate continues its travel it can pass a detack corotron 68. That corotron neutralizes some of the charge on the substrate to assist in separating the substrate from the photoreceptor 34. As the leading edge of the substrate moves around the tension roller 42 the edge separates from the photoreceptor. The substrate is then directed into a fuser where a heated fuse roller 70 and a pressure roller 72 creates a nip through which the substrate 64 passes. The combination of pressure and heat at the nip causes the composite color toner image to fuse into the substrate. After fusing, a chute, not shown, guides the substrate to a catch tray, also not shown, for removal by an operator.

After the substrate is separated from the photoreceptor belt 34 the image area continues its travel and can pass a preclean erase lamp 74. That lamp neutralizes most of the charge remaining on the photoreceptor belt. After passing the preclean erase lamp the residual toner and/or debris on the photoreceptor is removed at a cleaning station 76. At the cleaning station cleaning brushes wipe residual toner particles from the image area. This marks the end of the fourth cycle. The image area then passes once again to the precharge erase lamp and the start of another multi-pass imaging process.

Using well known technology the various machine functions described above are generally managed and regulated by a controller, such as image processing station 80 described below, which provides electrical command signals for controlling the operation described above. For instance, it is contemplated that the charging stations 46, 62, 66, etc. can include various corona generating devices such as a DC scorotron, AC scorotron, pin scorotron corotron, dicorotron, or other corona charging devices known in the art for charging the image area. Further, the toner development stations 52–58 can include various developers such as magnetic brush-type developer, scavengeless-type developer, etc.

With continuing reference to FIG. 5, an image processing station (IPS) 80 includes data processing and control electronics that prepare and manage the image data flow to the raster output scanner 48. A network of one or more personal computers (PC) 82 can be interfaced/in communication with IPS 80. A user interface (UI) 84 is also in communication with IPS 80. The UI 84 enables an operator to control and monitor various operator adjustable functions and maintenance activities. The operator actuates the appropriate keys of UI 84 to adjust the parameters of the copy. The UI 84 can be a touch screen, or any other suitable control panel, providing an operator interface with the system. The output signal from UI 84 is transmitted to the IPS 80.

A multiple color document 86 can be positioned on, for example, a raster input scanner (RIS) 88 associated with an input section 89 of the image processing system. The RIS includes document illumination lamps, optics, a mechanical scanning drive, and a charge coupled device (CCD array) or full width scanning array, etc. RIS 88 captures the entire image from the original document 86 and converts it to a series of raster scan lines and moreover measures a set of primary color densities, i.e., red, green, and blue densities, at each point of the original document. RIS 88 can provide data on the scanned image to IPS 80, indirectly to PC 82 and/or directly to PC 82. Digitized electronic documents can be created, modified, stored, and/or otherwise processed by PC 82 prior to transmission/relay to IPS 80 for printing by the image processing subsystem 32. IPS 80 can include the processor(s) and controller(s) required to perform the halo reduction process of the present invention.

Figure 6:
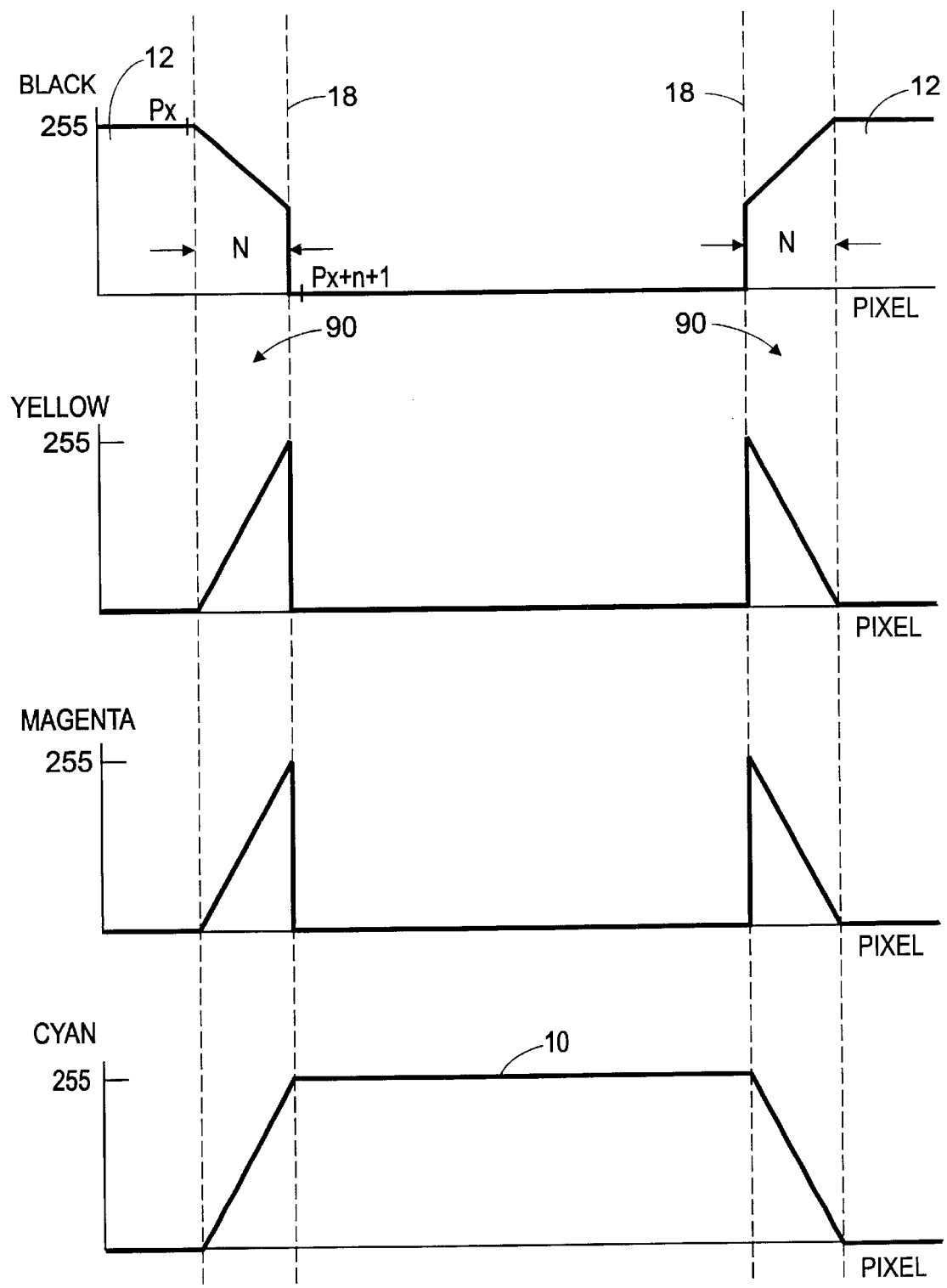
FIG. 6 illustrates one example of how the pixel values along a scan line through each color separation (cyan, magenta, yellow, black) are adjusted or modified in accordance with the present invention.

Referring to FIG. 6, to prevent halo print defects from occurring along the edge/border 18 between the image objects 10, 12, a pixel transition zone 90 is established within each color separation (CMYK). The last N pixels of the object image 12 adjacent the border 18 are included within the transition zone 90. Referring to the black color separation in FIG. 6, each pixel associated with object image 12 not within the transition zone 90 has a video value of 255. Each pixel associated with the object image 10 has a video value of zero within the black color separation. The video values for the pixels within the transition zone of the black color separation are adjusted by initially determining an increment value (i):

$$i=(P_{X+N+1}-P_X)/2N, \quad \text{Eq. 1}$$

where $P_X$ is the video value of the pixel associated with object image 12 that is adjacent the transition zone, and N is the width of the transition zone in pixels. The adjusted video value for each transition zone pixel $P_Z$ is determined from:

$$P_Z=P_Z+i\,(Z/N), \text{Eq. 2}$$

where $P_Z$ is the video value of the zth pixel in the transition zone; N is the width of the transition zone in pixels; and i is the increment value determined from equation 1. Thus, the video values of the black color separation pixels within the transition zone 90 are progressively reduced (i.e. downwardly sloped or ramped) to the point that the video value of the last pixel $P_{X+N}$ within the transition zone 90 is about half-way between the video values of the pixels $P_X$ and $P_{X+N-1}$ or, in the case of the example being described, about 128.

Referring to the cyan, magenta, and yellow color separations in the example of FIG. 6, the video value of each pixel associated with the image object 12, excluding the transition zone, is about 0. The pixel values within the transition zone are progressively increased (i.e. upwardly sloped or ramped) by determining an increment value i from:

$$i=(255-P_X)/N, \quad \text{Eq. 3}$$

where $P_X$ is the video value of the pixel associated with the object image 12 that is adjacent to the transition zone; and N is the width of the transition zone in pixels. The video value of each transition zone pixel $P_Z$ is determined from equation 2 above. Thus, the video values of the cyan, magenta, and yellow color separation pixels within the transition zone 90 are progressively increased to the point that the value of the last pixel $P_{X+N}$ within the transition zone is, in the example being described, about 255. Referring to the cyan color separation, the video value for each pixel associated with the image object 10 remains at about 255.

In effect; the above process increasingly replaces toner black with process black (i.e. equal parts of cyan, magenta, and yellow toner particles) in the transition zone 90 in a direction toward the boundary 18. As a result the electrostatic interactions on the photoreceptor 36 are reduced and halo print defects are eliminated. It should be appreciated that the toner black is reduced to about 50% at the boundary 18 because the process black alone may not produce a satisfactory shade of black color on the resulting output copy.

Although the above example illustrates the case where a transition zone is created within the object image 12, it is contemplated that the transition zone could have been created within the image object 10 is a like manner. It is also contemplated that, utilizing the object oriented imaging techniques described below, the location of the transition zone can be automatically determined on-the-fly depending upon the classification of the image objects being processed. It is also contemplated that transition zones can be established within each adjoining image object such that the pixel values within each transition zone are sloped or ramped so as to reduce or eliminate a sharp transition of pixel values occurring at the edge/boundary between the object images.

Figure 7:
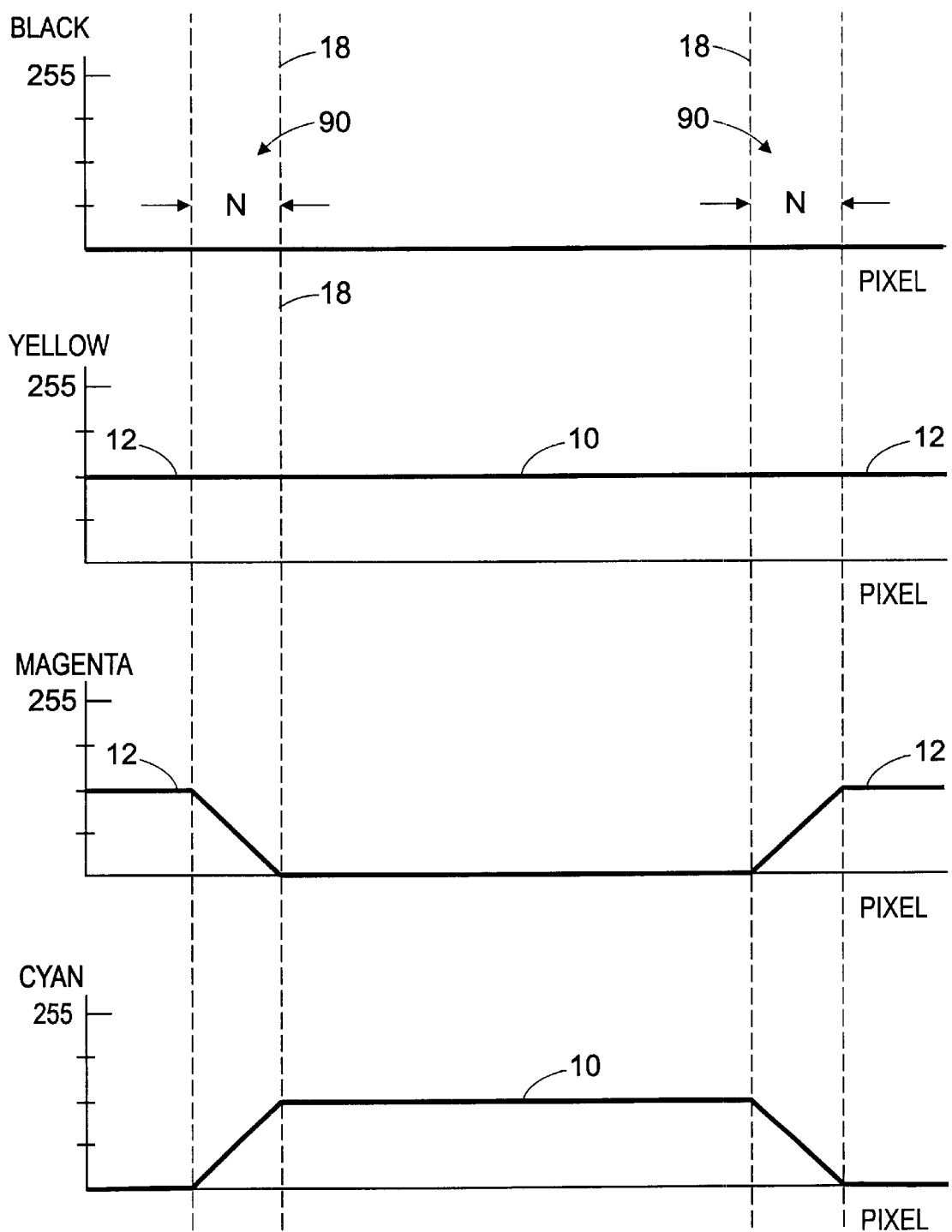
FIG. 7 illustrates another example of how the pixel values along a scan line through each color separation (cyan, magenta, yellow,) are adjusted or modified in accordance with the present invention.

FIG. 7 shows an example where toner black is not used. In particular, the first image object 10 is blue (equal parts cyan and yellow) and the second object 12 is red (equal parts magenta and yellow). In this case, the pixel values within the transition zones of the cyan and magenta color separations slope or ramp toward the pixel values of first object image 10 in accordance with equations 2 and 3 above.

Figure 4:
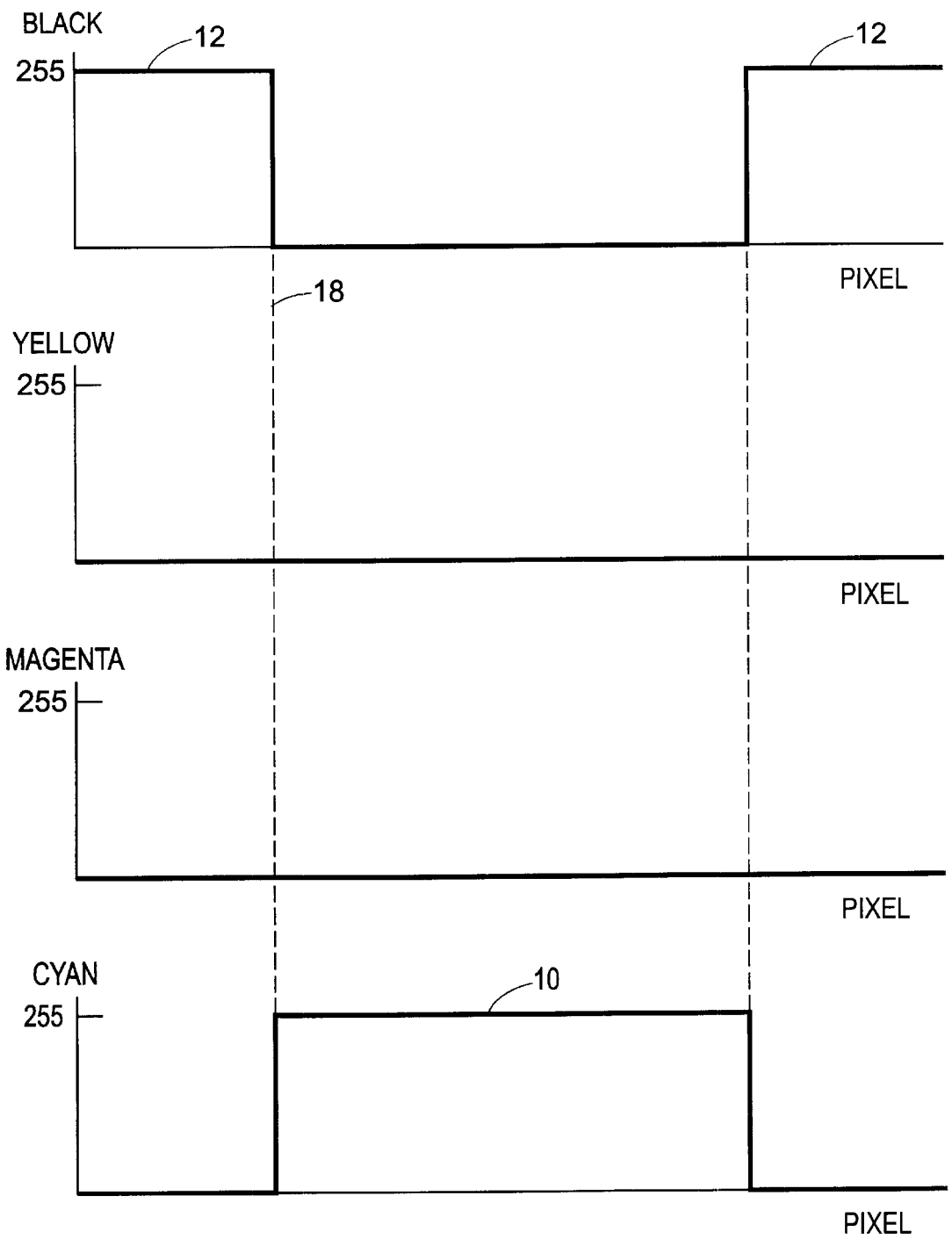
FIG. 4 graphs the pixel values along a scan line through each color separation (cyan, magenta, yellow, black) of the composite digital image representation of FIG. 2.

It should be appreciated that the slope of the pixel values within the transition zone is based on i) the width N of the transition zone, and ii) the difference between the pixel values on either side of the transition zone ($P_{X+N+1}-P_X$). Halo print defects are known to occur as the slope becomes infinite (as in the case of FIG. 4). Likewise, as the slope becomes more gradual, halo print defects are eliminated. However, the edges of certain object images such as text can become blurred when the width of the transition zone is increased. Thus, the width N of the transition zone can be optimized (either by the user or automatically) to reduce halo defects while maintaining sharp edges within the image. In the embodiment being described, the transition zone can vary from about 2 to about 40 pixels wide, and preferably from about 2 to about 6 pixels wide.

It is contemplated that object-oriented or object-classified image processing techniques can be utilized to identify objects within an image being processed. Object-oriented classification utilizes object tags (meta-bits) that contain information as to the type of image, pictorial, tint, or text, that is being processed. The object tags are created using image segmentation techniques for scanned pages. Alternatively, object tags can be created at the time a document represented in some Page Description Language (PDL) is rendered by the raster image processor or imager.

The tag bits can be used to adjust, on-the-fly, the width N of the transition zone depending upon the classification of the pixel being processed. The tag bits can also be used to decide whether or not to slope the pixel values within the transition zone. For instance, in the case of a small font text on a tinted background, too much resolution may be lost by creating a transition zone around each letter. Accordingly, in situations in which ramping the video values would cause degradations in image quality, such ramping is either not performed at all, or the width of the transition zone is sufficiently reduced to prevent such degradations.

The edges or boundaries within each of the color separations can be determined with an edge detection filter such as a laplacian filter or a difference recursive filter in a known manner. Hardware used to implement the pixel value ramping technique can include a scan line buffer capable of holding a requisite set of scanlines. If an object oriented system is used, an additional buffer for the tag bits is needed.

Although the present invention has been described in detail above, various modifications can be implemented without departing from the spirit of the present invention. For example, the preferred embodiment of the present invention has been described with respect to a digital color printer system, however, the present invention is readily implemented in a digital color copier or other digital image processing system.

Moreover, the image processing system of the present invention can be readily implemented on a general purpose computer, a personal computer or workstation. The image processing system of the present invention can be readily implemented on an ASIC, thereby enabling the placement of this process in a scanner, electronic subsystem, printer, or display device.

The present invention has been described with respect to a video range of 0 to 255. However, it is contemplated by the present invention that the video range can be any suitable range to describe the grey level of the pixel being processed. Furthermore, the present invention is readily applicable to any image processing system, not necessarily a binary output device.

While the invention has been described with reference to various embodiments disclosed above, it is not confined to the details set forth above, but is intended to cover such modifications or changes as may come within the scope of the attached claims.

Having thus described the preferred embodiment(s), the invention is now claimed to be:

1. A method of reducing halo print defects in a color document generated by an image processing system, the method comprising:
 a) detecting a boundary between a first image object and a second image object within a color separation of the color document; and
 b) modifying the video values of a plurality of pixels within the color separation so that the video values slope toward the boundary, the plurality of pixels being located within a transition zone adjacent the boundary, said modifying including:
  determining if a difference exists between a first pixel value associated with the first object image and a second pixel value associated with the second object image; and
  if a difference exists, modifying the video values of the plurality of pixels so that they ramp between the first pixel value associated with the first object image and the second pixel value associated with the second object image.

2. The method of claim 1, further including:
 c) analyzing a tag bit associated with a pixel being processed to select a width in pixels of the transition zone.

3. The method of claim 1, further including:
 c) analyzing a tag bit associated with a pixel being processed to determine whether to execute the modifying step.

4. The method of claim 1, further including:
 c) analyzing a tag bit associated with a pixel being processed to decide whether the transition zone should be associated with the first object image, the second object image, or both object images.

5. The method of claim 1, further including:
 c) modulating a raster output scanner based on the modified video values.

6. The method of claim 1, wherein the transition zone is about 2 to about 40 pixels wide.

7. The method of claim 6, wherein the transition zone is about 2 to about 6 pixels wide.

8. The method of claim 1, wherein the image processing system is a digital xerographic color copier.

9. The method of claim 1, wherein the image processing system is a digital xerographic color printer.

10. The method of claim 1, wherein the image processing system includes a multipass image processing subsystem.

11. The method of claim 1, wherein the image processing system includes a single-pass image processing subsystem.

12. The method of claim 1, wherein steps a) and b) are repeated for a plurality of color separations associated with the color document.

13. A method of reducing halo print defects in a color document generated by an image processing system, the method comprising:
   a) detecting a boundary between a first image object and a second image object within a color separation of the color document;
   b) modifying the video values of a plurality of pixels within the color separation so that the video values slope toward the boundary, the plurality of pixels being located within a transition zone adjacent the boundary;
   c) modifying the video values of a plurality of pixels within a transition zone of a toner black color separation so that the video values ramp down toward the boundary; and,
   d) modifying the video values of a plurality of pixels within transition zones of a cyan color separation, a magenta color separation, and a yellow color separation so that the video values ramp up toward the boundary.

14. The method of claim 13, wherein step d) includes:
   ramping up the video values in the cyan, magenta and yellow color separations by substantially equal amounts.

15. The method of claim 13, wherein step d) includes:
   ramping up the video values in the cyan, magenta and yellow color separations to about 100% at the boundary.

16. The method of claim 13, wherein step c) includes:
   modifying the video values of the plurality of pixels within the transition zone of the toner black color separation so that the video values ramp down at the boundary to about one half of a difference between a first pixel value associated with the first object image and a second pixel value associated with the second object image.

17. An image processing system comprising:

an imagan forming section for generating an composite toner image on a charge retentive surface; and, an image processing section for processing pixel values associated with a plurality of color separations representing an original multiple-color image, the processed pixel values being transferred to the image forming section; said image processing section including:
   means for detecting a boundary between a first image object and a second image object within a color separation; and,
   means for modifying the values of a plurality of pixels within the color separation, said plurality of pixels being located within a transition zone adjacent the boundary, said means for modifying modifying the values of the plurality of pixels within the transition zone of a toner black color separation so that the pixel values ramp down toward the boundary, and modifying the values of the plurality of pixels within respective transition zones of a cyan color separation, a magenta color separation, and a yellow color separation so that the pixel values ramp equally up toward the boundary.

18. An image processing system comprising:

tan image forming section for generating an composite toner image on a charge retentive surface; and, an image processing section for processing pixel values associated with a plurality of color separations representing an original multiple-color image, the processed pixel values being transferred to the image forming section; said image processing section including:
   means for determining if a difference exists between a first pixel value associated with a first object image and a second pixel value associated with a second object image within a color separation; and,
   means for modifying the pixel values of a plurality of pixels within the color separation so that the pixel values ramp between the first pixel value associated with the first object image and the second pixel value associated with the second object image when a difference exists.

* * * * *